Oct. 21, 1941.   W. G. BALZ ET AL   2,260,204
FISHING ROD HANDLE
Filed Sept. 5, 1939
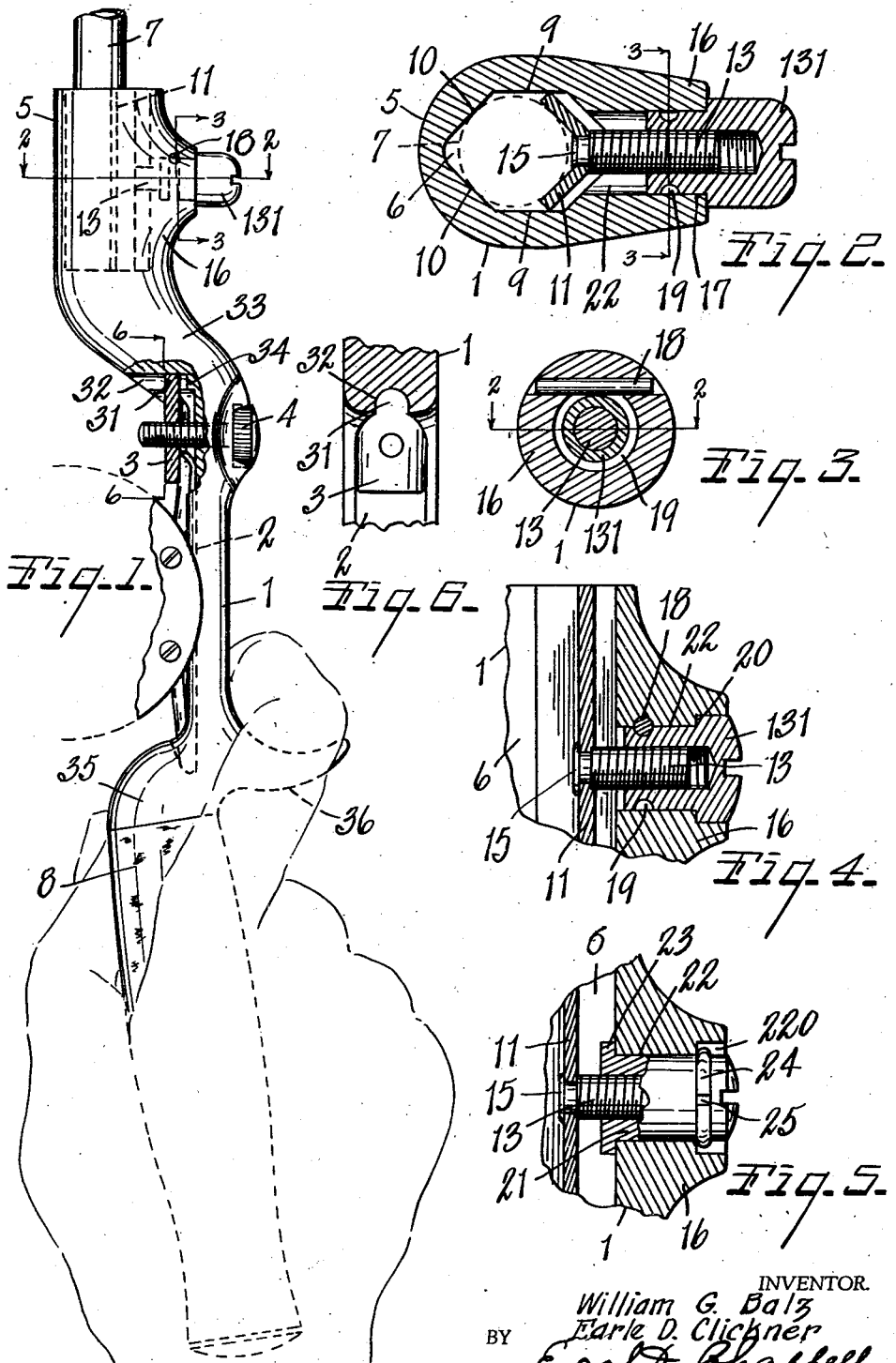
INVENTOR.
William G. Balz
Earle D. Clickner
BY
Earl D. Chappell
ATTORNEYS Patented Oct. 21, 1941

2,260,204

UNITED STATES PATENT OFFICE 2,260,204

FISHING ROD HANDLE

William G. Balz and Earle D. Clickner, Kalamazoo, Mich., assignors to Shakespeare Company, Kalamazoo, Mich., a corporation of Michigan Application September 5, 1939, Serial No. 293,384

8 Claims. (Cl. 43—23)

This invention relates to improvements in fishing rod handles.

The main objects of this invention are:

First, to provide a novel and improved handle for casting rods having provisions adapting the same to be associated with rods of different diameters.

Second, to provide a handle of the type described having the gripping and rod-receiving portions thereof disposed in a novel relation to enable greater accuracy in casting by fishermen of average skill.

Third, to provide a handle for fishing rods which substantially reduces wrist strain and fatigue.

Further objects relating to details and economies of the invention will definitely appear from the description to follow. The invention is defined in the claims.

A structure embodying the features of the invention is illustrated in the accompanying drawing, wherein:

Fig. 1 is a fragmentary view of a fishing rod equipped with a handle in accordance with this invention, illustrating the manner in which the handle of the invention contributes to accuracy and lessened wrist strain in casting, and also illustrating means thereon for adapting the handle to receive rods of various sizes.

Fig. 2 is an enlarged view in section taken on line 2—2 of Figs. 1 and 3, illustrating details of the adjustable rod socket and clamp of the invention.

Fig. 3 is an enlarged view in section taken on line 3—3 of Fig. 1.

Figs. 4 and 5 are enlarged fragmentary views in section illustrating modified embodiments of the actuating or adjusting element for the adjustable rod clamp in accordance with this invention.

Fig. 6 is a view in section on line 6—6 of Fig. 1, illustrating improved details of the reel clamping structure of our invention.

In present day handles for fishing rods, it is common practice to provide a reel seat which is offset laterally from the axis of the rod a sufficient distance to bring the shaft of the reel or the periphery of the wound spool into the line of said axis. In all such handles to our knowledge the gripping portion has likewise been disposed in the line of the rod and reel shaft or spool periphery, with the result that the handle in normal casting tends to aline itself with the arm of the caster, i. e., at an angle to the line of his aim from the eye to the spot to which the cast is to be made. It thus happens that unless the wrist is cocked substantially toward the right in the case of a right-handed angler, the cast has a tendency to go to the left of the intended line of cast. Accordingly, in order to keep the rod directly in line with the intended line of cast, it requires that an effort be continually made to keep the wrist cocked to one side, with resultant fatigue. The objection inevitably characterizes all rod handles whether offset to receive the reel or not, so long as the gripping portion of the handle is in a straight line with the rod. The present handle overcomes these objections in a highly simplified manner, making it possible to cast accurately for considerable periods with a minimum of wrist strain.

Further features of our invention relate to improved means whereby a given handle may be employed with a number of rods of different sizes or diameters, including simple adjustable clamp means for securing any desired rod in place on the handle, as will be hereinafter described.

In the accompanying drawing reference numeral 1 indicates in general a fishing rod handle embodying our invention. This handle comprises a reel seat 2 adapted to receive the base plate of a fishing reel and provided with a clamping element 3 for the base plate adjustable to clamping relation and to release the base plate by means of a screw having a knurled head 4.

The clamping element 3 has an integral forwardly-extending tongue-like projection 31 which slides vertically in a semi-circular groove 32 formed in the front offset portion 33 of the reel seat and thereby restrains the element from lateral movement or rotation when the screw 4 is actuated. This maintains the vertical alinement of the clamping element in position to engage the reel base at all times. The groove 32 ends in spaced relation to the bottom of the reel seat, thereby providing a small step 34 on which element 3 rests, providing a gap under the same for the reception of the reel base.

At its forward end the handle is provided with a socket portion or head 5 having therein a socket designated generally by numeral 6, adapted to receive a rod as 7. It will be noted that the reel seat portion 2 is substantially laterally offset relative to the socket portion and that the grip portion 8 is disposed at an angle to the reel seat portion and the socket portion. In this embodiment the inner end of the grip portion lies below the central plane of the socket in the socket portion. The grip is disposed, in the embodiment illustrated, at an angle of approximately ten degrees relative to the socket and reel seat portions. The angle is the result of difference in the offsets at the front and rear of the reel seat which provides the correct hand position for the thumbing of the reel, with the thumb resting comfortably on a pillar of the reel so that the thumbing may be done by the ball of the thumb rather than the tip of the thumb.

It will be noted that the socket portion and the reel seat portion are joined by rearwardly tapered and rearwardly inclined portion 33, while the handle and reel seat portion are joined by a forwardly-facing downward shoulder-like portion 35. A finger grip or trigger 36 is disposed at the juncture point of the reel seat and the grip. The angles and rearwardly tapered portion 33 afford plenty of hand space for fingering the line in winding it onto the reel. The angularity of the grip relative to the rod supported from the socket compensates for the fact that the angler's arm is at an angle to the line of aim from his eye to the spot at which the cast is directed and largely eliminates the necessity for the angler to cock his wrist to offset the angularity. This we find results not only in more accurate casting but very substantially reduces the fatigue and strain on the wrist.

As illustrated in Fig. 2, the rod receiving socket 6 in the handle is of a size substantially larger than the largest diameter of rod which it is desired to mount therein and has the parallel side walls 9 which are connected at one end by the angled converging walls 10 serving as one jaw of a clamp, the other jaw of which is constituted by the V-shaped relatively elongated clamping element 11 to which a left-hand threaded screw element 13 is fixed by means of a peened-over head 15.

The rod receiving portion 5 of the handle has an enlarged boss 16 at one side thereof which is drilled to receive the screw element 13, the thus constituted radial opening 22 being closed by means of a nut 131 having a reduced portion 17 rotatable in the opening in the boss. This nut is left-hand threaded to engage the screw element 13 and is restrained from axial movement in the boss by means of a pin 18 extending through the boss and engaging an annular groove 19 in the nut. The latter has a kerf therein to facilitate tightening or loosening of the same. Otherwise, the nut is rounded smooth and polished and affords no chance for tangling of the line thereon.

In Fig. 4 we illustrate a modified embodiment of the foregoing invention, wherein the opening 22 receiving the nut is counterbored at 20 to receive the rounded head of the nut, with the latter lying substantially entirely within the counterbore. In Fig. 5 we illustrate a still further modified embodiment of our invention, wherein the nut 21 is inserted in the opening 22 from the interior of the rod receiving recess 6, having an annular shoulder 23 engaging the handle to prevent movement to the right. The opposite or outer end of the opening 22 is counterbored a sufficient diameter at 220 to receive a split spring-locking ring 24 seating in an appropriate annular groove 25 in the nut and thereby restraining the latter from axial movement. In the embodiments of Figs. 5 and 4 the head of the nut is set into the surface of the boss, thus minimizing the chance of snagging the line.

In Fig. 1, we have illustrated a hand in position for grasping the handle in proper casting position; that is, with the head or crank of the reel upwardly. The neck portion 33 is so shaped and spaced relative to the reel clamped in the reel seat that there is abundant room between this neck and the reel to accommodate the fingers of the operator while fingering the line in winding it onto the reel which is a matter of very decided convenience.

We have illustrated and described our improvements in embodiments which are very practical. We have not attempted to illustrate or describe other embodiments or adaptations, as it is believed this disclosure will enable those skilled in the art to embody or adapt our improvements as may be desired.

Having thus described our invention, what we claim as new and desire to secure by Letters Patent is:

1. A handle for a fishing rod having a relatively large rod-receiving recess therein adapted to receive rods of different diameters, a clamp non-rotatively disposed in said recess to engage a rod against a wall of the latter, a threaded adjusting member fixedly secured to said clamp whereby axial movement of the member shifts the clamp, said handle having a cylindrical opening therethrough in which said adjusting member is disposed, and a nut rotatably mounted in said cylindrical opening and left-hand-threaded internally to engage said threaded adjusting member, and a pin carried by said handle engaging an annular groove in said nut for restraining axial movement of said nut whereby rotation thereof results in axial adjusting movement of the adjusting member.

2. A handle for a fishing rod having a relatively large rod-receiving recess therein adapted to receive rods of different diameters, a clamp disposed in said recess to engage a rod against a wall of the latter, a threaded adjusting member connected to said clamp, said handle having a cylindrical opening therethrough in which said adjusting member is disposed, and a nut rotatably mounted in said cylindrical opening and threaded internally to engage said threaded adjusting member, and means for restraining axial movement of said nut whereby rotation thereof results in axial adjusting movement of the adjusting member.

3. A handle for fishing rods having a socket at its forward end and provided with a grip, said socket having substantially parallel side walls and flattened converging top walls, a V-shaped clamping jaw arranged in said socket in opposed relation to said converging walls and coacting therewith to clampingly support rods of varying diameters, said jaw being provided with a threaded stem and the wall of the socket with a transverse bore receiving said stem, and an adjusting nut rotatively mounted in said bore to coact with said stem and adapted for manual manipulation, the exterior side surfaces of said socket portion of said handle being curved and the exposed portion of said adjusting nut being curved.

4. A handle for fishing rods having a socket at its forward end and provided with a grip, said socket having flattened converging walls at one side thereof, a V-shaped clamping jaw arranged in said socket in opposed relation to said converging walls and coacting therewith to clampingly support rods of varying diameters, said jaw being provided with a threaded stem and said socket with a bore receiving said stem, and an adjusting nut rotatively mounted in said bore to coact with said stem and adapted for manual manipulation.

5. A handle for fishing rods comprising a forward rod receiving portion, an intermediate reel seat portion, and a grip portion, said reel seat portion being substantially laterally offset relative to said forward portion and said grip portion being disposed in a downwardly inclined angular relation to said forward and reel seat portions, the forward portion being joined to the forward end of the reel seat portion by a rearwardly inclined and rearwardly tapered neck and the grip portion being joined to the rearward end of the reel seat portion by a rounded forwardly-facing portion upwardly offset relative to the reel seat, there being a downwardly projecting finger piece at the junction of the grip and the reel seat portions.

6. A handle for fishing rods comprising a forward rod receiving portion, an intermediate reel seat portion, and a grip portion, said reel seat portion being substantially laterally offset relative to said forward portion and said grip portion being disposed in a downwardly inclined angular relation to said forward and reel seat portions, the forward portion being joined to the forward end of the reel seat portion by a rearwardly and downwardly inclined neck and the grip portion being joined to the rearward end of the reel seat portion by a portion upwardly offset relative to the reel seat.

7. A handle for fishing rods having a forwardly opening rod receiving socket and a grip, said socket being adapted to receive rods of varying diameter and being of greater size than the largest rod receivable thereby, a clamping jaw in said socket adjustable laterally therein relative to a side wall of the socket to clamp a rod between said wall and jaw, and a threaded member extending laterally of the socket and connected to the jaw for actuating the same laterally, said threaded member having means associated therewith actuable from the exterior of the handle for laterally adjusting the jaw.

8. A handle for fishing rods having a portion defining a forwardly opening rod receiving socket, said socket being adapted to receive rods of varying diameter and being of greater size than the largest rod receivable thereby, a clamping jaw in said socket adjustable laterally therein relative to a side wall of the socket to clamp a rod between said wall and jaw, and a member connected to the jaw and having means associated therewith actuable from the exterior of the handle for laterally adjusting the jaw.

WILLIAM G. BALZ.
EARLE D. CLICKNER.